United States Patent
Okiyama

(10) Patent No.: US 11,419,353 B2
(45) Date of Patent: Aug. 23, 2022

(54) FOOD HEATING APPARATUS

(71) Applicant: SODICK CO., LTD., Kanagawa (JP)

(72) Inventor: Takeshi Okiyama, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 215 days.

(21) Appl. No.: 17/027,684

(22) Filed: Sep. 21, 2020

(65) Prior Publication Data

US 2021/0100390 A1 Apr. 8, 2021

(30) Foreign Application Priority Data

Oct. 2, 2019 (JP) .............................. JP2019-182066

(51) Int. Cl.
| | |
|---|---|
| *A23L 3/02* | (2006.01) |
| *A47J 27/00* | (2006.01) |
| *A47J 36/32* | (2006.01) |
| *A23L 7/109* | (2016.01) |

(52) U.S. Cl.
CPC .............. *A23L 3/027* (2013.01); *A23L 7/109* (2016.08); *A47J 27/002* (2013.01); *A47J 36/32* (2013.01); *A47J 2027/008* (2013.01)

(58) Field of Classification Search
CPC .......... A23L 3/027; A23L 3/045; A23L 3/065; A23L 3/085; A23L 3/0155; A23L 7/109; A47J 2027/008
See application file for complete search history.

(56) References Cited

U.S. PATENT DOCUMENTS 3,619,126 A * 11/1971 Carvallo ................... A61L 2/07
422/38
2019/0116850 A1 4/2019 Osako et al.

FOREIGN PATENT DOCUMENTS

| JP | 60108015 A | * | 6/1985 |
| JP | 60198114 A | * | 10/1985 |
| JP | 60207558 A | * | 10/1985 |

* cited by examiner

*Primary Examiner* — John J Norton
(74) *Attorney, Agent, or Firm* — JCIPRNET

(57) ABSTRACT

A food heating apparatus includes a main tank, a water exhaust tank, reserve tanks, communication chambers, heat insulating partition walls, a water exhaust tank and pressure exhaust pipes. The main tank stores water exceeding 100° C. The reserve tanks communicate with the main tank and imparts hydraulic head pressure to the water in the main tank. The communication chambers are respectively between the main tank and the reserve tank and have top plates higher than a top plate of the main tank. The heat insulating partition walls separate the main tank and each reserve tank and protrude into the front communication chamber. The water exhaust tank higher than the communication chambers has an upper surface higher than water surfaces of the reserve tanks. The pressure exhaust pipes have inlet openings in the top plates of the communication chambers and outlet openings within the water exhaust tank higher than the water surfaces.

9 Claims, 2 Drawing Sheets

FOOD HEATING APPARATUS

CROSS-REFERENCE TO RELATED APPLICATIONS

This application claims the priority benefit of Japan Patent Application No. 2019-182066, filed on Oct. 2, 2019. The entirety of the above-mentioned patent application is hereby incorporated by reference herein and made a part of this specification.

BACKGROUND

Technical Field

The disclosure relates to a food heating apparatus. Particularly, the disclosure relates to a food heating apparatus using hydraulic head pressure which continuously heats food with water having a temperature higher than 100° C.

Related Art

The food heating apparatus using hydraulic head pressure is an apparatus which uses hydraulic head pressure to heat foods such as noodles, retort foods and canned foods with water having a temperature higher than 100° C. Heating at a high temperature may improve food texture in some cases depending on the type of the food. In addition, heating at a high temperature may suppress deterioration of quality of food in some cases because of shortening of heating time. Therefore, the food heating apparatus using hydraulic head pressure is used for, for example, noodle boiling and sterilization. In the following description, unless otherwise specified, a temperature exceeding 100° C. is referred to as a high temperature, and water having a temperature exceeding 100° C. is referred to as high-temperature water.

In the food heating apparatus using hydraulic head pressure, a steam layer is formed on a water surface of a main tank and on each water surface of a front reserve tank and a rear reserve tank adjacent to the main tank, but the steam layer becomes thin because of the hydraulic head pressure. Therefore, heat of high-temperature water in the main tank is easily transferred to water in each reserve tank, and heat insulation between the main tank and each reserve tank is relatively low. Thus, each reserve tank become unable to store water having a low temperature within a relatively short time.

A food heating apparatus using hydraulic head pressure disclosed in U.S. Patent Application No. 2019/0116850 includes: a main tank that stores high-temperature water; a front reserve tank and a rear reserve tank that store water having a temperature lower than the temperature of the high-temperature water in the main tank; and a pair of communication chambers that respectively connect the main tank to each reserve tank, and the food heating apparatus using hydraulic head pressure supplies a pressurized fluid such as a pressurized gas or a pressurized liquid to the communication chambers. In the food heating apparatus, the pressurized fluid within the communication chambers has a heat insulating function, and heat insulation between the main tank and each reserve tank is improved.

In the food heating apparatus using hydraulic head pressure configured to supply a pressurized fluid to the communication chambers to insulate heat, the communication chambers have a strong structure the same as a pressure vessel being substantially sealed and are relatively large. Because the pressure vessel is subject to regulation, a predetermined qualification is required for manufacturing and it is necessary to perform regular inspections. Therefore, manufacturing cost and running cost are increased.

In addition, the food heating apparatus using hydraulic head pressure configured to supply a pressurized fluid to the communication chambers to insulate heat is excellent in heat insulation; however, the high-temperature water in the main tank gradually flows into the communication chambers and is mixed with the pressurized fluid for heat insulation, the temperature of the pressurized fluid rises inevitably, and the water temperature in the reserve tanks rises with the passage of time. In order to enable long-term operation, supply of low-temperature water is required to lower the temperature of the water in the reserve tanks. At this time, convection occurs in the communication chambers and a large amount of the low-temperature water with a small specific gravity for cooling is mixed into the main tank, and thus the temperature of the water positioned in a lower layer in the main tank is below a temperature required as the high-temperature water. As a result, heating efficiency is reduced.

In addition, steam that continues to be generated little by little in the main tank flows into the communication chamber from the main tank. If a pressure in the communication chamber rises because of long-term operation and the steam cannot be trapped, there is a possibility that high-pressure steam may flow into the reserve tank and spout from an open portion above the reserve tank. At this time, if the main tank and the communication chambers are evacuated in order to reduce the apparent increase in capacity caused by steam pressure, the heat insulating effect by the pressurized fluid is deteriorated, and thus there is a possibility that operation may have to be interrupted. In addition, because work of steam exhausting is not easy, burden on an operator is heavy.

The disclosure mainly provides a food heating apparatus using hydraulic head pressure which has a relatively simple structure and enables continuous operation for a longer time.

SUMMARY

According to the disclosure, a food heating apparatus is provided which includes a main tank, a front reserve tank, a rear reserve tank, a front communication chamber, a rear communication chamber, a front-side heat insulating partition wall, a rear-side heat insulating partition wall, a water exhaust tank, a first pressure exhaust pipe, and a second pressure exhaust pipe, wherein the main tank that has a top plate at a predetermined height and stores water at a temperature higher than 100° C.; the front reserve tank that communicates with the main tank, has a height for imparting a required hydraulic head pressure to the water in the main tank, and has an upper surface being open; the rear reserve tank that communicates with the main tank, has a height for imparting a required hydraulic head pressure to the water in the main tank, and has an upper surface being open; the front communication chamber that is arranged between the main tank and the front reserve tank and has a top plate at a position higher than the top plate of the main tank; the rear communication chamber that is arranged between the main tank and the rear reserve tank and has a top plate at a position higher than the top plate of the main tank; the front-side heat insulating partition wall that is arranged to separate the main tank and the front reserve tank and with an upper end protruding into the front communication chamber in a manner that the upper end is at a position higher than the top plate of the main tank; the rear-side heat insulating partition wall that is arranged to separate the main tank and the rear reserve tank and with an upper end protruding into the rear communication chamber in a manner that the upper end is at a position higher than the top plate of the main tank; the water exhaust tank that is arranged at a position higher than the front communication chamber and the rear communication chamber and has an upper surface at a position higher than water surfaces of the front reserve tank and the rear reserve tank; the first pressure exhaust pipe that has an inlet opening arranged in the top plate of the front communication chamber and an outlet opening arranged at a position within the water exhaust tank higher than the water surfaces of the front reserve tank and the rear reserve tank; and the second pressure exhaust pipe that has an inlet opening arranged in the top plate of the rear communication chamber and an outlet opening arranged at a position within the water exhaust tank higher than the water surfaces of the front reserve tank and the rear reserve tank.

DESCRIPTION OF THE EMBODIMENTS

The food heating apparatus of the disclosure can continuously perform heat processing with high-temperature water by hydraulic head pressure. At this time, the configuration is not substantially sealed by arranging the pressure exhaust pipes in the communication chambers to release excessive pressure in the communication chambers, and thus the communication chambers is not regulated by regulation of pressure vessel. Therefore, the structure is relatively simple and small, and the cost can be reduced. In addition, because the pressure is controlled by the water level in each tank, handling is easy.

In addition, instead of using a pressurized fluid, the food heating apparatus of the disclosure utilizes a difference in specific gravity between the high-temperature water and water of less than 100° C. to separately form a high-temperature water layer and a layer of water of less than 100° C. Accordingly, the food heating apparatus of the disclosure can continuously heat and cool the food to be heated. For example, when the food to be heated is noodles such as udon, the food heating apparatus of the disclosure can boil up the noodles until the centre of noodles to have a chewy and sticky food texture.

In the food heating apparatus of the embodiment, "front" refers to a side on which a pre-processing step of heat processing is performed, that is, a lateral side where the food to be heated is introduced into a heating tank 1. "Rear" refers to a side on which a post-processing step of the heat processing is performed, that is, a lateral side where the food to be heated is taken out from the heating tank 1. Specifically, a right side in FIG. 1 is the front and a left side in FIG. 1 is the rear.

In addition, in the following description, water having a temperature above 100° C. is referred to as high-temperature water, water having a temperature higher than room temperature and equal to or less than 100° C. is referred to as hot water, and water having a temperature equal to or less than room temperature is referred to as low-temperature water. Low-temperature water includes water whose temperature is not adjusted and water cooled by a cooler.

Figure 1:
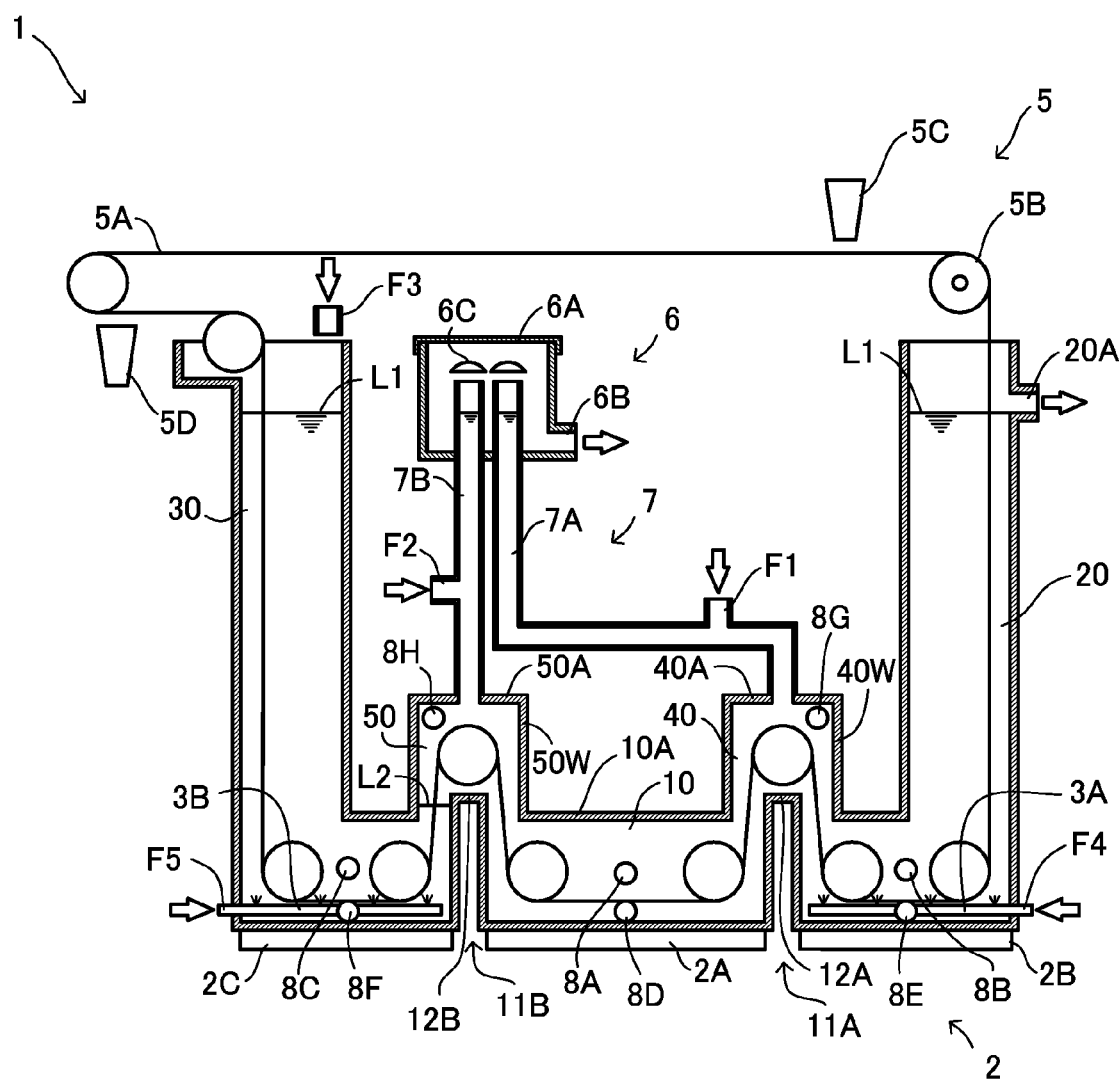
FIG. 1 is a schematic configuration view of a food heating apparatus of the embodiment.

As shown in FIG. 1, the food heating apparatus of the embodiment includes the heating tank 1, a heater 2, a water-supplier 3, a controller 4, and a food conveyor 5. The heating tank 1 includes a main tank 10, a front reserve tank 20, a rear reserve tank 30, a front communication chamber 40, and a rear communication chamber 50. The front communication chamber 40 is arranged between the main tank 10 and the front reserve tank 20. The rear communication chamber 50 is arranged between the main tank 10 and the rear reserve tank 30. In addition, a water exhaust tank 6 is installed above the main tank 10 of the heating tank 1. The heating tank 1 and the water exhaust tank 6 are connected by a pair of pressure exhaust pipes 7.

The main tank 10 stores high-temperature water. The main tank 10 has a top plate 10A at a predetermined height. The front reserve tank 20 has an upper surface being open. The front reserve tank 20 communicates with the main tank 10 via the front communication chamber 40 and has a height for imparting a required hydraulic head pressure to the water in the main tank 10. The rear reserve tank 30 has an upper surface being open. The rear reserve tank 30 communicates with the main tank 10 via the rear communication chamber 50 and has a height for imparting a required hydraulic head pressure to the water in the main tank 10. The height of the front reserve tank 20 and the height of the rear reserve tank 30 may be the same.

The front communication chamber 40 is arranged between the main tank 10 and the front reserve tank 20. The front communication chamber 40 has a top plate 40A at a position higher than the top plate 10A of the main tank 10. The rear communication chamber 50 is arranged between the main tank 10 and the rear reserve tank 30. The rear communication chamber 50 has a top plate 50A at a position higher than the top plate 10A of the main tank 10. The height of the top plate 40A of the front communication chamber 40 and the height of the top plate 50A of the rear communication chamber 50 may be the same.

A front-side heat insulating partition wall 11A is arranged in the heating tank 1 to separate the main tank 10 and the front reserve tank 20. The front-side heat insulating partition wall 11A consists of a pair of side plates separated by a predetermined interval and a top plate defining an upper end 12A. In the front-side heat insulating partition wall 11A, the upper end 12A is arranged protruding into the front communication chamber 40 in a manner that the upper end 12A is at a position higher than the top plate 10A of the main tank 10. Thus, the front-side heat insulating partition wall 11A is formed in a manner that water in the front reserve tank 20 bypasses the front communication chamber 40 and flows into the main tank 10 without directly flowing between the front reserve tank 20 and the main tank 10.

A rear-side heat insulating partition wall 11B is arranged in the heating tank 1 to separate the main tank 10 and the rear reserve tank 30. The rear-side heat insulating partition wall 11B consists of a pair of side plates separated by a predetermined interval and a top plate defining an upper end 12B. In the rear-side heat insulating partition wall 11B, the upper end 12B is arranged protruding into the rear communication chamber 50 in a manner that the upper end 12B is at a position higher than the top plate 10A of the main tank 10. Thus, the rear-side heat insulating partition wall 11B is formed in a manner that water in the rear reserve tank 30 bypasses the rear communication chamber 50 and flows into the main tank 10 without directly flowing between the rear reserve tank 30 and the main tank 10.

The water exhaust tank 6 is arranged at a position higher than the front communication chamber 40 and the rear communication chamber 50. An upper surface 6A of the water exhaust tank 6 is at a position higher than a water surface L1 when the water in the front reserve tank 20 and the rear reserve tank 30 reaches maximum level. In the food heating apparatus of the embodiment, the water exhaust tank 6 is installed in a manner that the position of the upper surface 6A is equal to or higher than heights of the upper surfaces of the front reserve tank 20 and the rear reserve tank 30.

The front reserve tank 20 is provided with an overflow outlet 20A at a predetermined height for discharging the water in the front reserve tank 20. The overflow outlet 20A overflows the stored water to define and limit the water level of the front reserve tank 20 to the height of the water surface L1. Substantially, a water level of the entire heating tank 1 is also limited to the height of the overflow outlet 20A. A bottom surface of the water exhaust tank 6 is at a position lower than the height position of the overflow outlet 20A of the front reserve tank 20. The water exhaust tank 6 is provided with a drain 6B having the same height as the bottom surface of the water exhaust tank 6.

The pair of pressure exhaust pipes 7 has a first pressure exhaust pipe 7A arranged between the front communication chamber 40 and the water exhaust tank 6, and a second pressure exhaust pipe 7B arranged between the rear communication chamber 50 and the water exhaust tank 6. The first pressure exhaust pipe 7A has an inlet opening arranged in the top plate 40A of the front communication chamber 40 and an outlet opening arranged at a position within the water exhaust tank 6 higher than a water surface L1 of the front reserve tank 20 and the rear reserve tank 30. The second pressure exhaust pipe 7B has an inlet opening arranged in the top plate 50A of the rear communication chamber 50 and an outlet opening arranged at a position within the water exhaust tank 6 higher than the water surface L1 of the front reserve tank 20 and the rear reserve tank 30. In other words, the outlet opening of the first pressure exhaust pipe 7A and the outlet opening of the second pressure exhaust pipe 7B are installed at positions higher than the overflow outlet 20A.

Both the first pressure exhaust pipe 7A and the second pressure exhaust pipe 7B penetrate a bottom plate of the water exhaust tank 6 and are installed in a manner that the outlet openings are positioned in the water exhaust tank 6. Each of the outlet openings is covered with a shielding material 6C in a manner of not being completely blocked. A first water inlet F1 for supplying water to the first pressure exhaust pipe 7A to suppress bumping is arranged between the inlet opening and the outlet opening of the first pressure exhaust pipe 7A. A second water inlet F2 for supplying water to the second pressure exhaust pipe 7B to suppress bumping is arranged between the inlet opening and the outlet opening of the second pressure exhaust pipe 7B. High-pressure steam in the front communication chamber 40 or the rear communication chamber 50 is jetted from the outlet openings through the pair of pressure exhaust pipes 7. The steam that condensed to water is temporarily collected in the water exhaust tank 6 and discharged from the drain 6B to an outside of the water exhaust tank 6.

A third water inlet F3 is arranged on an upper surface side of the rear reserve tank 30. When the heating tank 1 is empty, water is supplied to the rear reserve tank 30 mainly from the third water inlet F3 to fill the heating tank 1 with water. In addition, the water is appropriately replenished through the third water inlet F3 when the water is reduced. For example, when the water in the heating tank 1 evaporates and the amount of water in the heating tank 1 becomes insufficient, the heating tank 1 is appropriately replenished with water from the third water inlet F3, and the amount of the water in the heating tank 1 is maintained.

During water-supply, the operator may manually open and close the water inlets, or water may be automatically supplied. For example, the food heating apparatus may be controlled in a manner that a liquid level sensor for detecting the water level is arranged in the heating tank 1, and the controller 4 automatically supplies and replenishes the water according to the detected water level. Moreover, in the embodiment, the overflow outlet 20A is arranged in the front reserve tank 20 that is often operated to store hot water having a relatively high temperature from 90° C. to 100° C., and the third water inlet F3 is arranged in the rear reserve tank 30 that is often operated to store low-temperature water, and thus temperature change in the heating tank 1 is kept small.

A first supply pipe 3A that supplies water to the front reserve tank 20 is arranged at the lower part of the front reserve tank 20. A fourth water inlet F4 is arranged at one end of the first supply pipe 3A and supplies water to the first supply pipe 3A. The water supplied to the first supply pipe 3A is discharged into the front reserve tank 20 through plural holes formed in the first supply pipe 3A. A second supply pipe 3B that supplies water to the rear reserve tank 30 is arranged at the lower part of the rear reserve tank 30. The fourth water inlet F4 is arranged at one end of the second supply pipe 3B and supplies water to the second supply pipe 3B. The water supplied to the second supply pipe 3B is discharged into the rear reserve tank 30 through plural holes formed in the second supply pipe 3B.

Figure 2:
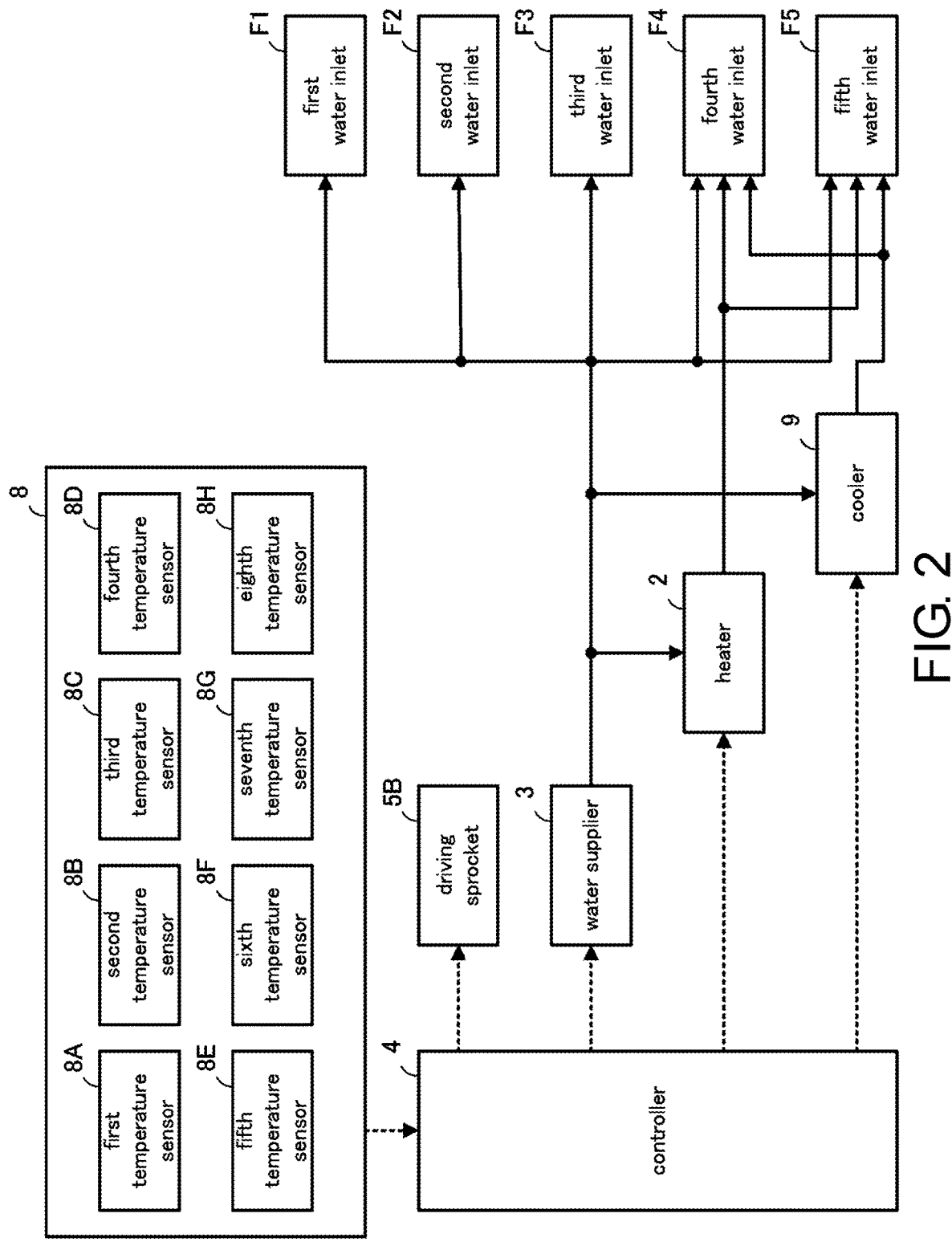
FIG. 2 is a block diagram showing a control system and water-supply paths of the embodiment.

FIG. 2 shows a control system and water-supply paths in the food heating apparatus of the embodiment. Moreover, in FIG. 2, signals of the control system are indicated by broken line arrows, and the water-supply paths are indicated by solid line arrows. Moreover, in the water-supply paths, valves such as an on-off valve for opening and closing flow paths, a switching valve for switching the flow paths, an adjusting valve for adjusting a flow rate, a check valve for preventing backflow, and the like are appropriately arranged. The controller 4 includes an operation panel having an input device and a display device, and hardware in which a processor, a memory, and various circuits are appropriately combined, and controls each part of the food heating apparatus.

The heating tank 1 is provided with plural temperature sensors 8. The plurality of temperature sensors 8 have, as temperature sensors for temperature adjustment, a first temperature sensor 8A, a second temperature sensor 8B, and a third temperature sensor 8C, and as temperature sensors for bumping detection, a fourth temperature sensor 8D, a fifth temperature sensor 8E, a sixth temperature sensor 8F, a seventh temperature sensor 8G, and an eighth temperature sensor 8H. The temperature sensors for temperature adjustment 8A, 8B and 8C respectively measure temperatures of the water in the main tank 10, the front reserve tank 20, and the rear reserve tank 30, and continue to output the measured temperatures in the form of detection signals to the controller 4. The temperature sensors for bumping detection 8D, 8E, 8F, 8G and 8H output a detection signal to the controller 4 when a predetermined bumping temperature is detected. The predetermined bumping temperature is a temperature pre-set as a temperature at which bumping occurs.

In the food heating apparatus of the embodiment, the temperature sensors for temperature adjustment 8A, 8B and 8C are respectively installed at positions as close as possible to the middle of each of the main tank 10, the front reserve tank 20, and the rear reserve tank 30 in order that an average temperature in the water tanks can be detected.

The temperature sensors for bumping detection 8D, 8E and 8F are respectively installed at positions as close as possible to a bottom surface of each of the main tank 10, the front reserve tank 20, and the rear reserve tank 30 in order that occurrence of bumping in each tank can be detected. The temperature sensors for bumping detection 8G and 8H are respectively arranged close to an upper surface of the front communication chamber 40 and the rear communication chamber 50 in order that occurrence of bumping in each communication chamber can be detected.

The heater 2 is configured to be capable of respectively and independently heating the main tank 10, the front reserve tank 20, and the rear reserve tank 30. The heater 2 includes plural heating units 2A, 2B and 2C and a heating source not shown. The heating unit 2A is arranged on the bottom surface side of the main tank 10. The heating unit 2B is arranged on the bottom surface side of the front reserve tank 20. The heating unit 2C is arranged on the bottom surface side of the rear reserve tank 30. When at least one of the fourth temperature sensor 8D, the fifth temperature sensor 8E and the sixth temperature sensor 8F has detected the predetermined bumping temperature, the controller 4 makes the heater 2 act so as to operate the heating source to stop heating the main tank 10, the front reserve tank 20, and the rear reserve tank 30.

The heating units 2A, 2B and 2C of the heater 2 include a steam type or an electric type heating device. The heating units 2A, 2B and 2C of the heater 2 may include both the steam type heating device and the electric type heating device and separately use the two types of heating devices by operating the two types of heating devices simultaneously or alternately depending on the purpose of heating. A heating source of the steam type heating device is, for example, a boiler. A heating source of the electric type heating device is, for example, a power source and a heat exchanger.

The water-supplier 3 supplies water to the plurality of water inlets F1, F2, F3, F4 and F5 from a water source not shown. The water-supplier 3 includes, for example, pipes respectively connected to the water source and each water inlet, and on-off valves arranged on the pipes. The water source is, for example, waterworks. The water supplied from the water-supplier 3 may be heated or cooled as needed. In addition, when a temperature of the water supplied from the water-supplier 3 is adjusted, the temperature may be adjusted through a heater or a cooler 9. Moreover, the heater for heating the water supplied from the water-supplier 3 may also serve as the heater 2 which heats the main tank 10, the front reserve tank 20 and the rear reserve tank 30. The cooler 9 includes, for example, a heat exchanger. The food heating apparatus of the embodiment is configured to be capable of supplying tap water to the heater 2 or the cooler 9 to heat or cool the water to the predetermined temperature as necessary and then supplying the temperature-adjusted water to the fourth water inlet F4 or the fifth water inlet F5.

The food conveyor 5 includes an endless chain 5A, one or more driving sprockets 5B, a charging chute 5C, and a discharging chute 5D. The endless chain 5A is provided with a plurality of buckets (not shown) at uniform predetermined intervals. The driving sprockets 5B are connected to a driving source (not shown) capable of speed control, such as a motor. The charging chute 5C charges the food to be heated into the buckets. The discharging chute 5D takes the food to be heated out from the buckets.

The operation of the food heating apparatus of the embodiment shown in FIGS. 1 and 2 is described below. When the empty heating tank 1 is filled with water, a valve not shown is operated by the operation panel of the controller 4 to supply water to the heating tank 1 from the third water inlet F3. Preferably, a liquid level sensor for detecting the water level is arranged in the rear reserve tank 30, and the water-supply is automatically stopped when the heating tank 1 is filled with water. In order to shorten the water supply time, water may be supplied from the fourth water inlet F4 and the fifth water inlet F5 at the same time.

When the water in the heating tank 1 is heated, the controller 4 operates the heater 2 to heat each tank of the heating tank 1. The food heating apparatus of the embodiment can be operated in various forms. The water in the main tank 10 is high-temperature water having a temperature exceeding 100° C. The water in the front reserve tank 20 and the rear reserve tank 30 may both be low-temperature water. One of the water in the front reserve tank 20 and the rear reserve tank 30 may be hot water, and the other may be low-temperature water. The water in the front reserve tank 20 and the rear reserve tank 30 may both be hot water. The food heating apparatus of the embodiment is operated in a manner that the water in the main tank 10 is high-temperature water, the water in the front reserve tank 20 is hot water, and the water in the rear reserve tank 30 is low-temperature water.

The controller 4 measures the water temperatures of the main tank 10, the front reserve tank 20, and the rear reserve tank 30 of the heating tank 1 by the detection signals output from the temperature sensors for temperature adjustment 8A, 8B and 8C. When the water temperature of each tank reaches the predetermined temperature, the controller 4 drives the endless chain 5A to continuously charge the food to be heated into the buckets from the charging chute 5C at a predetermined timing.

The food heating apparatus of the embodiment stores, for example, hot water of 98° C. in the front reserve tank 20, stores low-temperature water of 25° C. in the rear reserve tank 30, and stores high-temperature water of 110° C. in the main tank 10 by hydraulic head pressure. For example, when the food to be heated is fresh udon, the fresh udon can be boiled with a good food texture in a shorter time. At this time, because the entire heating tank 1, including the front communication chamber 40 and the rear communication chamber 50, is substantially open, and the food heating apparatus has a configuration for suppressing bumping, when the udon is rinsed and cooled with the low-temperature water in the rear reserve tank 30, there is low possibility that the udon bursts to be broken.

The controller 4 constantly monitors the detection signals output from the plurality of temperature sensors 8 while the food heating apparatus is operating. The controller 4 operates the heater 2 and the water-supplier 3 at a predetermined timing to maintain each water temperature in the main tank 10, the front reserve tank 20, and the rear reserve tank 30 of the heating tank 1 at a predetermined temperature. For example, when the water temperature of the front reserve tank 20 is lowered by about 1° C. below the predetermined temperature of 98° C., the controller 4 operates the heater 2 to raise the temperature of the heating unit 2B. For example, when the water temperature of the rear reserve tank 30 rises by 1° C. above the predetermined temperature of 25° C., the controller 4 operates the water-supplier 3 to supply low-temperature water of 5° C. to lower the temperature. The water used for the temperature adjustment in each tank may be heated or cooled by the heater 2 or the cooler 9.

When the water in the heating tank 1 evaporates and the water level drops, the water is replenished from the third water inlet F3. When water is supplied from the third water inlet F3, the fourth water inlet F4, and the fifth water inlet F5 and the amount of water in the heating tank 1 exceeds a predetermined amount, the water level in the front reserve tank 20 rises and excess water is discharged from the overflow outlet 20A of the front reserve tank 20.

For example, when the food to be heated is fresh udon, the udon in the buckets of the food conveyor 5 is heated to 98° C. in the front reserve tank 20. The buckets enter the main tank 10 from the front reserve tank 20 through the front communication chamber 40, and the udon is boiled up with high-temperature water of 110° C. As described above, by preliminarily heating the food to be heated in the front reserve tank 20, the food to be heated is not rapidly heated by the high-temperature water.

An ideal heating temperature and heating time are known for each food to be heated. For example, when the food to be heated is fresh udon, the buckets pass through the main tank 10 at a speed corresponding to a desired boiling time of udon, and enter the rear reserve tank 30 through the rear communication chamber 50. When the buckets pass through the rear reserve tank 30 in which low-temperature water is stored at a predetermined speed, the udon immediately after being boiled up in the buckets is rinsed and cooled as if the udon is washed off with the low-temperature water.

The water in the main tank 10 is locally heated by the heating unit 2A independently of the front reserve tank 20 and the rear reserve tank 30. Because the hydraulic head pressure corresponding to the heights of the front reserve tank 20 and the rear reserve tank 30 is applied to the water in the main tank 10, the water reaches a high temperature exceeding 100° C. At this time, because the specific gravity of the high-temperature water is smaller than that of the low-temperature water and the hot water, the high-temperature water of the main tank 10 gradually flows into the front communication chamber 40 and the rear communication chamber 50 positioned above the main tank 10 by convection.

The front-side heat insulating partition wall 11A that separates the main tank 10 and the front reserve tank 20 is arranged below the front communication chamber 40. The rear-side heat insulating partition wall 11B that separates the main tank 10 and the rear reserve tank 30 is arranged below the rear communication chamber 50. The upper end 12A of the front-side heat insulating partition wall 11A and the upper end 12B of the rear-side heat insulating partition wall 11B are respectively higher than a lower end of an inner wall 40W of the front communication chamber 40 and a lower end of an inner wall 50W of the rear communication chamber 50, and form a so-called labyrinth structure.

Thus, for example, when the rear reserve tank 30 is a low-temperature water tank, the high-temperature water that gradually flows from the main tank 10 into the rear communication chamber 50 by the convection in the main tank 10 stays in an upper layer by a specific gravity difference with the low-temperature water in the rear reserve tank 30. Therefore, a boundary surface L2 between the high-temperature water and the low-temperature water exists in the part that is surrounded by the rear-side heat insulating partition wall 11B and the rear communication chamber 50 and that is a joint between the rear reserve tank 30 and the rear communication chamber 50. Because heat exchange between the high-temperature water and the low-temperature water occurs only at the boundary surface L2, the temperature of the low-temperature water in the rear reserve tank 30 is maintained. As described above, when the front reserve tank 20 or the rear reserve tank 30 is a low-temperature water tank, the temperature of the low-temperature water is maintained.

When the food heating apparatus is operated for a long time, in a case that the front reserve tank 20 is a hot water tank, the temperature of the front reserve tank 20 continues to rise, and finally the boundary surface spreads between the front reserve tank 20 and the front communication chamber 40 laterally along the flow paths. Because of the specific gravity difference between the high-temperature water and the hot water, the high-temperature water flowing into the front reserve tank 20 rises along an inner wall surface of the front reserve tank 20. When this phenomenon occurs, the high-temperature water reaches the overflow outlet 20A earlier than the hot water, and thus the high-temperature water is discharged earlier than the hot water. Therefore, the water temperature of the front reserve tank 20 changes only to an extent that the water temperature can be maintained simply by heating with the heating unit 2B for a short time.

On the other hand, in the rear reserve tank 30, low-temperature water is supplied from the third water inlet F3 to replenish the evaporated water, and the rise in the water temperature of the rear reserve tank 30 is suppressed. At this time, the water levels of the front reserve tank 20 and the rear reserve tank 30 rise on average in accordance with the amount of water added, and thus the excess water is discharged from the overflow outlet 20A of the front reserve tank 20. As a result, the water levels and the water temperatures are maintained and a maximum hydraulic head pressure is not changed.

Moreover, when the water is replenished and an apparent water level rises, the boundary surface L2 between the high-temperature water and the low-temperature water may rise by pressure, and the low-temperature water may flow over the rear-side heat insulating partition wall 11B and flow into the main tank 10. At this time, the amount of the high-temperature water is increased in the main tank 10, and thus the high-temperature water is pushed out toward the front communication chamber 40 and pushes down a boundary surface between the high-temperature water and the hot water in the front communication chamber 40. However, because the high-temperature water is still actively discharged from the overflow outlet 20A, the water temperature of the front reserve tank 20 is maintained.

Meanwhile, because the top plate 40A of the front communication chamber 40 and the top plate 50A of the rear communication chamber 50 are arrange at positions higher than the top plate 10A of the main tank 10, a water pressure in the front communication chamber 40 and a water pressure in the rear communication chamber 50 are lower than a water pressure in the main tank 10. When the high-temperature water flows into the front communication chamber 40 and the rear communication chamber 50 by convection caused by the high temperature of the water in the main tank 10, the water pressure suddenly drops in a state that the water temperature exceeds 100° C., and thus water steam is suddenly generated. As a result, a bumping phenomenon in which water steam is spout may occur.

In the food heating apparatus of the embodiment, because the pair of pressure exhaust pipes 7 is arranged which respectively has the inlet openings in the top plate 40A of the front communication chamber 40 and the top plate 50A of the rear communication chamber 50, when the bumping phenomenon occurs, the water steam that is jetted rises and escapes into the pressure exhaust pipes 7, and is discharged from the outlet openings of the pressure exhaust pipes 7. The water steam emitted from the outlet openings is collected in the water exhaust tank 6 which prevents the water steam from scattering. Then, water obtained by cooling the water steam is discharged from the drain 6B.

The pressure exhaust pipes 7 are filled with water, and the water steam rises through the water in the pressure exhaust pipes 7 and is released from the outlet openings of the pressure exhaust pipes 7. When it is determined that bumping has occurred based on the detection signals of the seventh temperature sensor 8G and the eighth temperature sensor 8H, which are temperature sensors for bumping detection, the controller 4 controls the water-supplier 3 as necessary to supply low-temperature water from the first water inlet F1 arranged in the first pressure exhaust pipe 7A or the second water inlet F2 arranged in the second pressure exhaust pipe 7B. Because the low-temperature water supplied from the middle of the pressure exhaust pipes 7 gently exchanges heat with the high-temperature water and enters the front communication chamber 40 or the rear communication chamber 50, a rapid temperature drop of the high-temperature water can be prevented and bumping can be suppressed.

On the other hand, when the fourth temperature sensor 8D, the fifth temperature sensor 8E and the sixth temperature sensor 8F which are the temperature sensors for bumping detection have detected bumping, the controller 4 stops the heater 2 based on the detection signals output by each of the temperature sensors 8D, 8E and 8F. Because each of the main tank 10, the front reserve tank 20, and the rear reserve tank 30 can be directly heated by the heating unit 2A, 2B and 2C, the water temperature can be lowered without supplying water, the rapid temperature drop of the high-temperature water can be prevented and the bumping can be suppressed.

While the food to be heated is heated, the controller 4 proportionally controls the heating temperatures of the heating unit 2A, the heating unit 2B, and the heating unit 2C of the heater 2 based on the detection signals of the first temperature sensor 8A, the second temperature sensor 8B and the third temperature sensor 8C which are the temperature sensors for temperature adjustment arranged in each tank in the heating tank 1, so as to respectively maintain the water temperature of each tank at a predetermined temperature.

When the high-temperature water flows into the front communication chamber 40 or the rear communication chamber 50 by convection, water steam is rapidly generated, and thus it is difficult to immediately lower the water temperature with high responsiveness. However, because the food heating apparatus of the embodiment is configured to supply low-temperature water from the first water inlet F1 and the second water inlet F2 arranged in the middle of the pressure exhaust pipes 7, the low-temperature water descends relatively gently in the pressure exhaust pipes 7 and exchanges heat with the high-temperature water. Therefore, bumping can be suppressed without rapidly lowering the temperature of the high-temperature water in the main tank 10.

The food heating apparatus of the disclosure is not limited to the configuration of the food heating apparatus of the specific embodiment described above. Although some examples have already been shown, various modifications are possible within the scope not departing from the technical idea of the disclosure. In addition, specific configurations of the heater, the water supplier, the conveyor, and the cooler may be configurations implemented in a known food heating apparatus.

The disclosure may be applied to a food heating apparatus which heats food at a high temperature, and may improve the food heating apparatus to heat food more safely at high temperature in a short time.

What is claimed is:

1. A food heating apparatus, comprising:
   a main tank that has a top plate at a predetermined height and stores water at a temperature higher than 100° C.;
   a front reserve tank that communicates with the main tank, has a height for imparting a required hydraulic head pressure to the water in the main tank, and has an upper surface being open;
   a rear reserve tank that communicates with the main tank, has a height for imparting a required hydraulic head pressure to the water in the main tank, and has an upper surface being open;
   a front communication chamber that is arranged between the main tank and the front reserve tank and has a top plate at a position higher than the top plate of the main tank;
   a rear communication chamber that is arranged between the main tank and the rear reserve tank and has a top plate at a position higher than the top plate of the main tank;
   a front-side heat insulating partition wall that is arranged to separate the main tank and the front reserve tank and with an upper end protruding into the front communication chamber in a manner that the upper end is at a position higher than the top plate of the main tank;
   a rear-side heat insulating partition wall that is arranged to separate the main tank and the rear reserve tank and with an upper end protruding into the rear communication chamber in a manner that the upper end is at a position higher than the top plate of the main tank;
   a water exhaust tank that is arranged at a position higher than the front communication chamber and the rear communication chamber and has an upper surface at a position higher than water surfaces of the front reserve tank and the rear reserve tank;
   a first pressure exhaust pipe that has an inlet opening arranged in the top plate of the front communication chamber and an outlet opening arranged at a position within the water exhaust tank higher than the water surfaces of the front reserve tank and the rear reserve tank; and
   a second pressure exhaust pipe that has an inlet opening arranged in the top plate of the rear communication chamber and an outlet opening arranged at a position within the water exhaust tank higher than the water surfaces of the front reserve tank and the rear reserve tank.

2. The food heating apparatus according to claim 1, further comprising:
   a first water inlet that is arranged between the inlet opening and the outlet opening of the first pressure exhaust pipe and supplies water to the first pressure exhaust pipe;
   a second water inlet that is arranged between the inlet opening and the outlet opening of the second pressure exhaust pipe and supplies water to the second pressure exhaust pipe; and
   a water-supplier that supplies water to the first water inlet and the second water inlet.

3. The food heating apparatus according to claim 2, further comprising:

a temperature sensor that is arranged in one of the front communication chamber and the rear communication chamber and detects a predetermined bumping temperature; and a controller configured to operate the water-supplier to supply water to the first water inlet and the second water inlet when the temperature sensor has detected the predetermined bumping temperature.

4. The food heating apparatus according to claim 2, further comprising:

temperature sensors that are arranged in each of the front communication chamber and the rear communication chamber and detect a predetermined bumping temperature; and a controller that operates the water-supplier to supply water to the first water inlet when the temperature sensor arranged in the front communication chamber has detected the predetermined bumping temperature, and operates the water-supplier to supply water to the second water inlet when the temperature sensor arranged in the rear communication chamber has detected the predetermined bumping temperature.

5. The food heating apparatus according to claim 1, further comprising:

a heater configured to be capable of respectively and independently heating the main tank, the front reserve tank, and the rear reserve tank;

plural temperature sensors that are respectively arranged in the main tank, the front reserve tank, and the rear reserve tank and detect a predetermined bumping temperature; and a controller that operates the heater to stop heating the main tank, the front reserve tank, and the rear reserve tank when at least one of the plural temperature sensors has detected the predetermined bumping temperature.

6. The food heating apparatus according to claim 1, comprising:

an overflow outlet that is arranged in the front reserve tank and defines a water level of the front reserve tank; and a third water inlet that is arranged in the rear reserve tank and supplies water to the rear reserve tank.

7. The food heating apparatus according to claim 1, comprising:

a first supply pipe that is arranged in the front reserve tank and supplies water to the front reserve tank;

a fourth water inlet that is arranged in the first supply pipe and supplies water to the first supply pipe;

a second supply pipe that is arranged in the rear reserve tank and supplies water to the rear reserve tank; and a fifth water inlet that is arranged in the second supply pipe and supplies water to the second supply pipe.

8. The food heating apparatus according to claim 7, further comprising a heater configured to be capable of heating the water supplied to at least one of the fourth water inlet and the fifth water inlet.

9. The food heating apparatus according to claim 7, further comprising a cooler configured to be capable of cooling the water supplied to at least one of the fourth water inlet and the fifth water inlet.

* * * * *